US005482349A

United States Patent [19]
Richter et al.

[11] Patent Number: 5,482,349
[45] Date of Patent: Jan. 9, 1996

[54] COMBINATION RECLINING AND FOLDING MECHANISM FOR AUTOMOTIVE SEAT ASSEMBLIES

[75] Inventors: Herbert A. Richter, Waterford; Wojciech Smuk, Troy, both of Mich.

[73] Assignee: Bertrand Faure Ltd., Mississauga, Canada

[21] Appl. No.: 234,954

[22] Filed: Apr. 28, 1994

[30] Foreign Application Priority Data

Dec. 18, 1993 [CA] Canada .................................. 2111725

[51] Int. Cl.⁶ ...................................................... B60N 2/30
[52] U.S. Cl. ...................... 297/15; 297/378.12; 297/321; 297/341; 296/65.1; 296/69
[58] Field of Search ............................. 297/15, 378.12, 297/321, 322, 341; 296/65.1, 69

[56] References Cited

U.S. PATENT DOCUMENTS

| | | | |
|---|---|---|---|
| 2,859,798 | 11/1958 | Carte | 297/321 |
| 2,926,948 | 3/1960 | Koplin et al. | 297/378.12 X |
| 3,151,906 | 10/1964 | Roberts | 297/15 X |
| 4,132,447 | 1/1979 | Terada | 297/378.12 X |
| 4,269,446 | 5/1981 | Gersmann et al. | 297/341 |
| 4,634,180 | 1/1987 | Zaveri et al. | 297/378.12 X |
| 4,736,985 | 4/1988 | Fourrey et al. | 296/69 X |
| 4,997,223 | 3/1991 | Croft | 297/378.12 X |
| 5,383,699 | 1/1995 | Woziekonski et al. | 297/15 X |

FOREIGN PATENT DOCUMENTS

| | | | |
|---|---|---|---|
| 2376008 | 9/1978 | France | 297/341 |
| 3829701 | 1/1980 | Germany | 297/378.12 |
| 3222274 | 2/1983 | Germany | 297/378.12 |
| 8036734 | 3/1983 | Japan | 297/378.12 |
| 199233 | 11/1983 | Japan | 297/341 |
| 2155780 | 10/1985 | United Kingdom | 297/341 |

*Primary Examiner*—Peter M. Cuomo
*Assistant Examiner*—David E. Allred
*Attorney, Agent, or Firm*—Patrick J. Hofbauer

[57] ABSTRACT

A latch mechanism is connected between the seatback member and the seat cushion member of a vehicle seat assembly to selectively control pivotal movement of the seatback member relative to the seat cushion member. A mounting mechanism is associated with each of the front and rear seat legs of the seat assembly and each such mounting mechanism is co-operable with a respective attachment member affixed to the vehicle floor to permit movement of the seat cushion member from a first in-use position within the vehicle to a second forwardly translated stowed position within the vehicle. The mounting member associated with at least one of the rear seat legs further comprises a lock mechanism that is selectively movable to restrainingly engage or disengage its respective attachment member. A first actuator is mounted on the seat assembly so as to be operatively moveable by a user from a neutral position, whereat the latch restrains pivotal movement of the seatback member, to an actuated position whereat pivotal movement of the seatback member is permitted. A second actuator is mounted on the seat cushion member and is operatively contacted by a portion of the seatback member upon forward pivoting of the seatback member, thereby causing unlocking the lock mechanism, so as to permit movement of the seat cushion member from its in-use position to its forwardly translated stowed position upon continued pivotal movement of the seat cushion member.

14 Claims, 8 Drawing Sheets

COMBINATION RECLINING AND FOLDING MECHANISM FOR AUTOMOTIVE SEAT ASSEMBLIES

FIELD OF THE INVENTION

The present invention relates to seat assemblies for automotive vehicles, and more particularly to movable vehicle seat assemblies that are forwardly foldable into a lowered, stored position to facilitate the loading of cargo into a vehicle on top of the seat assembly, such as may find use in multi-purpose utility or sport vehicles.

BACKGROUND OF THE INVENTION

Multi-purpose utility or sport vehicles, such as the JEEP™ CHEROKEE™ manufactured by Chrysler Corporation or the EXPLORER™ manufactured by Ford Motor Company, have become extremely popular among the general public in recent years. Such popularity is due in large measure to the ability of this type of vehicle to not only provide for the carriage of a plurality of vehicle passengers, but also to accommodate relatively large volumes of cargo, luggage or other bulky items when compared with traditional passenger vehicles. In some cases, the cargo carrying capacity of this type of automotive vehicle is enhanced by the selective removability of one or more of the rows of rear seats normally positioned in the vehicle behind the driver's seat (hereinafter referred in this specification as "rear seat assemblies"), and numerous patents have issued directed to attachment mechanisms which safely and conveniently permit such removal. However, an alternative approach to selectively creating more cargo space in an automotive vehicle has been to provide rear seat assemblies that are adapted to have a seatback member of the seat assembly that is pivotally movable from its generally upright passenger occupiable configuration to a relatively forwardly folded unoccupiable configuration and to have the seat cushion member upon which the passenger normally sits movable from its in-use position to a forwardly translated position within the vehicle, thereby to facilitate the loading of cargo into the vehicle on top of the generally flat rear surface of the backrest member. Such cargo capacity can be further enhanced if the rearward seat assembly is moved as aforesaid into a floor well provided in the vehicle, such that the generally flat rear surface of the seatback member is substantially horizontally aligned with an adjacent section of the floor of the vehicle rearwardly disposed to the floor well. All of these solutions are generally known in the prior art.

Notwithstanding these and other developments with respect to rear seat assemblies, the available seat assembly hardware necessary to accommodate the aforesaid composite movement of the seatback member and of the seat cushion member are generally unacceptable from several standpoints. In the first instance, such hardware is unreliable and complex, consisting of many close-fitting interacting machined parts, which factors contribute to their difficulty of production and assembly, and, hence, production costs. Moreover, prior art seat hardware available for this purpose is inconvenient to use, typically requiring two separate control handles to be sequentially actuated by the operator in a designated sequence.

For example, in one known prior art device, it is necessary for the operator to actuate a first control handle to release the seatback member for forward folding of the backrest member. Moreover, it is also necessary for the operator to actuate a second control handle to release the seat cushion member to allow for said forwardly translated motion of the seat cushion member within the vehicle. This is not only inconvenient for those users who understand the operation of the mechanism, but is conceptually difficult to grasp for those who do not understand such operation, or who are not technically minded.

Still more inconveniently, with most two handle prior art seat assemblies, the seatback member must be oriented to a specific generally upright first design position before it is possible to move the seat cushion member to the relatively forwardly translated stowed position, if a substantially flat orientation of the rear surface of the backrest member with the floor of the vehicle is to be achieved.

One seat assembly having a single user handle to control both folding of the seatback member and movement of the seat cushion member to the lowered, forwardly translated stowed position is known in the prior art. However, the mechanism of this seat assembly is not only complex and expensive to manufacture as aforesaid, but remains inconvenient to operate, in that it requires a precise composite movement of the user handle in order to carry out both functions. That is, in order to move the seatback member to its forwardly folded unoccupiable configuration as aforesaid, the user handle must be actuated by sliding the control handle in a first generally upward direction. Following actuation of the user handle in this manner, and after pivotal forward folding movement of the seatback member beyond a specific transition point, the control handle must then be slid by the user in a second, generally downward direction past the initial starting point of the control handle, so as to then permit movement of the seat cushion member to said forwardly translated stowed position. This composite movement of the control handle is not only inconvenient for the user, but also presupposes a familiarity with the manner of operation of the device before smooth operation is readily attainable. Moreover, substantially flat orientation of the rear surface of the backrest member as aforesaid is not automatically assured by this device, but is again dependant upon the starting position of the backrest member prior to movement of the seat cushion member.

From a safety standpoint, it is desirable to re-lock the seat cushion member to the floor member of the vehicle when it has been moved to its forwardly translated stowed position. Such re-locking also prevents or lessens annoying rattling of the seat assembly in this stowed position during movement of the vehicle. Most known prior art seat assemblies do not provide for such re-locking, or where they do, require a further action on the part of the user to effect such re-locking, and are for this reason not adequately convenient or safe.

It is, therefore, an object of the present invention to provide an improved movable seat assembly whose operation is simple to understand and which seat assembly is convenient to use.

It is a yet a further object of the present invention to provide an improved movable seat assembly for use in a vehicle, which seat assembly permits the device to be activated so as to permit relatively forwardly folding movement of the seatback member and movement of the seat cushion member to a forwardly translated stowed position within the vehicle, irrespective of the position of the backrest member upon initiating such compound movement.

It is a yet another object of a preferred embodiment of the present invention to provide an improved movable seat assembly for use in a vehicle having a floor member, which assembly is constructed to ensure that the rear surface of the seatback member is substantially horizontally aligned with an adjacent rearwardly disposed section of the floor member when the seat cushion member is in said forwardly translated stowed position, irrespective of the starting position of the backrest member upon initiating forward folding of the seatback member as aforesaid.

It is a yet another object of the present invention to provide an improved movable seat assembly for use in a vehicle having a floor member, which assembly incorporates a first actuation means which, when first activated by the user, permits the seatback member to be forwardly folded by the user over the seat cushion member, thereby to automatically unlock the seat cushion member from rigid attachment to the floor member of the vehicle, so as to allow the seat cushion member to be moved from its in-use position to a forwardly translated stowed position in a continuous motion without the need for the user to himself actuate a second actuation mechanism or otherwise move the first actuation means in another direction.

It is a yet another object of the present invention to provide an improved movable seat assembly for use in a vehicle having a floor member, which assembly incorporates a first actuation mechanism, which mechanism, when first activated by the user, permits the seatback member to be forwardly folded by the user over the seat cushion member, thereby to automatically unlock the seat cushion member from rigid attachment to the floor member, so as to allow the seat cushion member to be moved from its in-use position to a forwardly translated stowed position in a continuous motion without the need for the user to interrupt such continuous motion to actuate a second actuation mechanism or otherwise move the first actuation means.

It is still another object of the present invention to provide an improved movable seat assembly for use in a vehicle having a floor member, which assembly automatically provides for re-locking of the seat cushion member in rigid attachment to the floor member of the vehicle in said forwardly translated stowed position of said seat cushion member without further action by the user.

SUMMARY OF THE INVENTION

In accordance with the present invention there is disclosed a movable seat assembly for use in a vehicle having a floor member. The seat assembly comprises a seatback member pivotally movable with respect to a seat cushion member in a forward direction between a generally upright occupiable configuration and a relatively forwardly folded unoccupiable configuration, said seat cushion member having front seat legs and rear seat legs. Each of the front and rear seat legs have a mounting means co-operable with a respective attachment member rigidly affixed to the floor member of the vehicle. A latch means is operatively connected between the seatback member and the seat cushion member, and the latch means is movable between a first latched configuration, at which configuration the pivotal movement of the seatback member is arrested, and a second unlatched configuration at which configuration the pivotal movement of the seatback member is permitted. The mounting means associated with each of said front and rear seat legs is cooperable with its respective attachment member as aforesaid to permit movement of the seat cushion member from a first in-use position within the vehicle to a second forwardly translated stowed position within the vehicle. The mounting means associated with at least one of said rear seat legs comprises a lock means movable between a first locked configuration, at which configuration the lock means restrainingly engages the respective attachment member so as to hold the seat cushion member is in its first in-use position, and a second unlocked configuration at which configuration the seat cushion member is permitted to move as aforesaid toward the second forwardly translated stowed position. A first actuation means is mounted on the seat assembly so as to be operatively moveable by a user from a neutral position, whereat the latch means is held by the actuation means in the first latched configuration, to an actuated position, whereat the latch means has been urged by said actuation means to said second unlatched configuration, thereby to permit the aforesaid pivotal movement of the seatback member. A second actuation means is mounted on the seat cushion member so as to be operatively contacted by a portion of the seatback member at a first design position of the seatback member upon pivotal movement of said seatback member as aforesaid in said forward direction, thereby to move the lock means from its first locked configuration to its second unlocked configuration, so as to permit the aforesaid movement of the seat cushion member from the first in-use position to the second forwardly translated stowed position upon continued pivotal movement of the seat cushion member beyond the aforesaid first design position in the forward direction.

Other objects, advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which are briefly described hereinbelow.

DETAILED DESCRIPTION OF A PREFERRED EMBODIMENT

Figure 1:
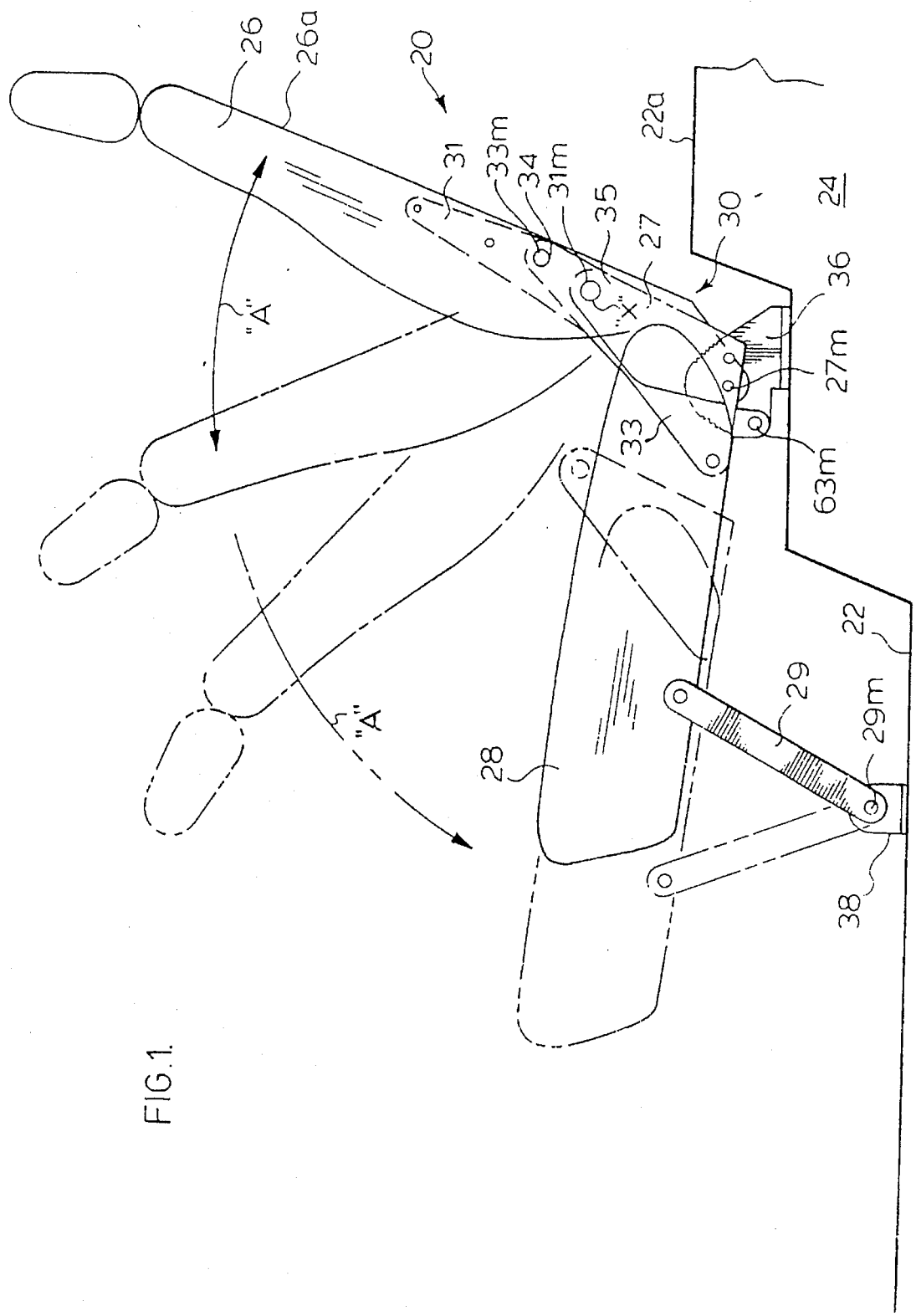
FIG. 1 is a diagrammatic side elevational view of a preferred embodiment of moveable seat assembly according to the present invention, shown in solid lining in a generally upright occupiable configuration and shown in ghost outlining in several intermediate forwardly folded positions.
Figure 2:
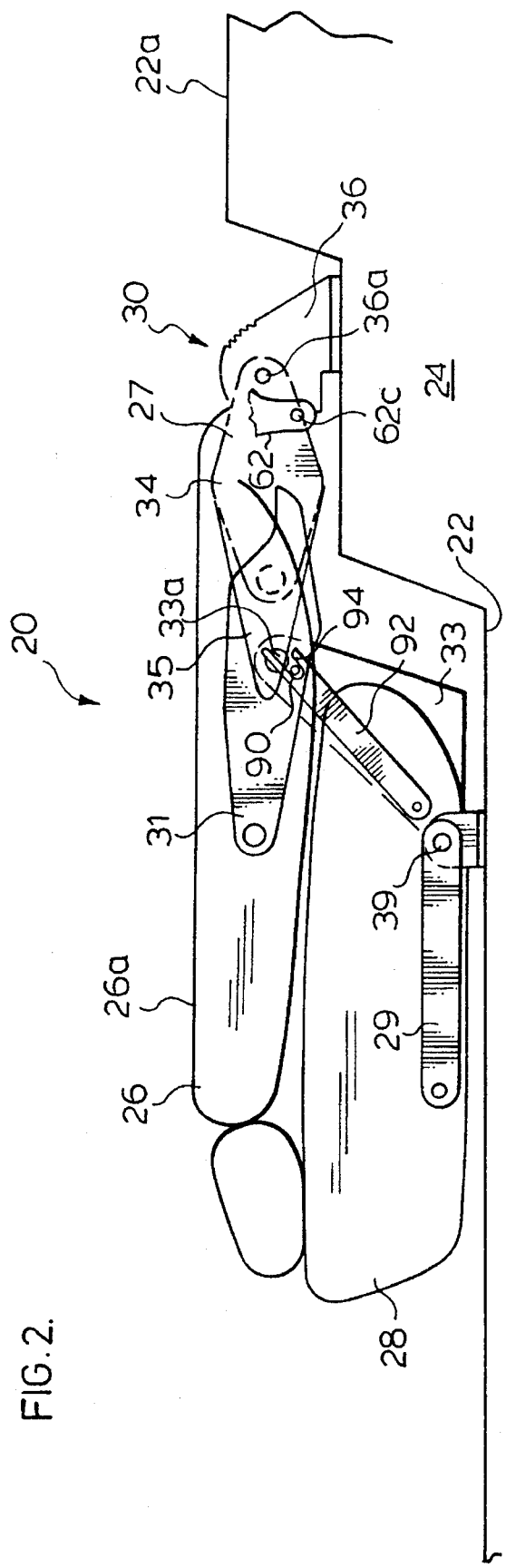
FIG. 2 is a diagrammatic side elevational view of the moveable seat assembly of FIG. 1 with the seat cushion member shown in a forwardly translated stowed position, and the seatback member shown in a forwardly folded unoccupiable configuration.

Reference will now be made to FIGS. 1–7, which show the moveable seat assembly of the present invention, as designated by the general reference numeral 20. The moveable seat assembly 20 is securely attached to the floor member 22 of a vehicle 24. The moveable seat assembly 20 comprises a seatback member 26 pivotally moveable about a first pivot axis "X" (see FIG. 1) with respect to a seat cushion member 28, in forward and rearward directions, as shown by arrow "A" of FIG. 1, between a generally upright occupiable configuration, as shown in solid outline in FIG. 1, and a relatively forwardly folded unoccupiable configuration, as shown in FIG. 2. The seatback member 26 and the seat cushion member 28 are pivotally connected one to the other by way of a hinge assembly, as designated by the general reference numeral 30. The hinge assembly 30 comprises a first seatback member hinge plate 31, a second seatback member hinge plate 32, a seat cushion member hinge plate 33 (see FIG. 7), a first intermediate hinge plate 34, and a second intermediate hinge plate 35. The first seatback member hinge plate 31 and the second seatback member hinge plate 32 are secured to each other by a conventional fastening method, such as orbital staking or ring staking. The first seatback member hinge plate 31 and second seatback member hinge plate 32 assembly is rigidly attached to the seatback member 26, preferably by threaded fastening means (not shown), as is well known in the industry. The seat cushion member hinge plate 33 is rigidly attached to the seat cushion member 28, again, conventionally by threaded fastening means (not shown). The first intermediate hinge plate 34 and the second intermediate hinge plate 35 are also secured to each other in spaced apart relation, with suitable spacers (not shown) therebetween, by a conventional fastening method, such as orbital staking or ring staking. The seat cushion member hinge plate 33 is independently pivotally mounted to the first intermediate hinge plate 34 for independent pivotal movement about a second pivot axis "Y" by way of mounting pin 33m. The mounting pin 33m is secured in place by a conventional fastening method such as orbital staking or ring staking. The first seatback member hinge plate 31 and second seatback member hinge plate 32 assembly is independently pivotally mounted to the first intermediate hinge plate 34 and second intermediate hinge plate 35 assembly for independent pivotal movement about the first pivot axis "X" by way of mounting pin 31m. The mounting pin 31m is also secured in place by a conventional fastening method such as orbital staking or ring staking.

The seat cushion member 28 is also forwardly and rearwardly moveable between a first in-use position within the vehicle 24, as shown in solid lining in FIG. 1, and a second forwardly translated stowed position within the vehicle, as shown in FIG. 2. The seat cushion member 28 is moved between its first in-use position and its second forwardly translated stowed position in conjunction with the seatback member 26 being moved from its generally upright occupiable configuration to its relatively forwardly folded unoccupiable configuration. When the seat cushion member 28 is in its second forwardly translated stowed position and the seatback member 26 is in its relatively forwardly folded unoccupiable configuration, generally on top of the seat cushion member 28, a second design position is defined. In the preferred embodiment, the rear surface 26a of the seatback member 26 is substantially horizontally aligned with an adjacent rearwardly disposed section 22a of the floor member, so as to provide a large, relatively flat substantially horizontal surface to facilitate the placement of cargo thereon.

Figure 8:
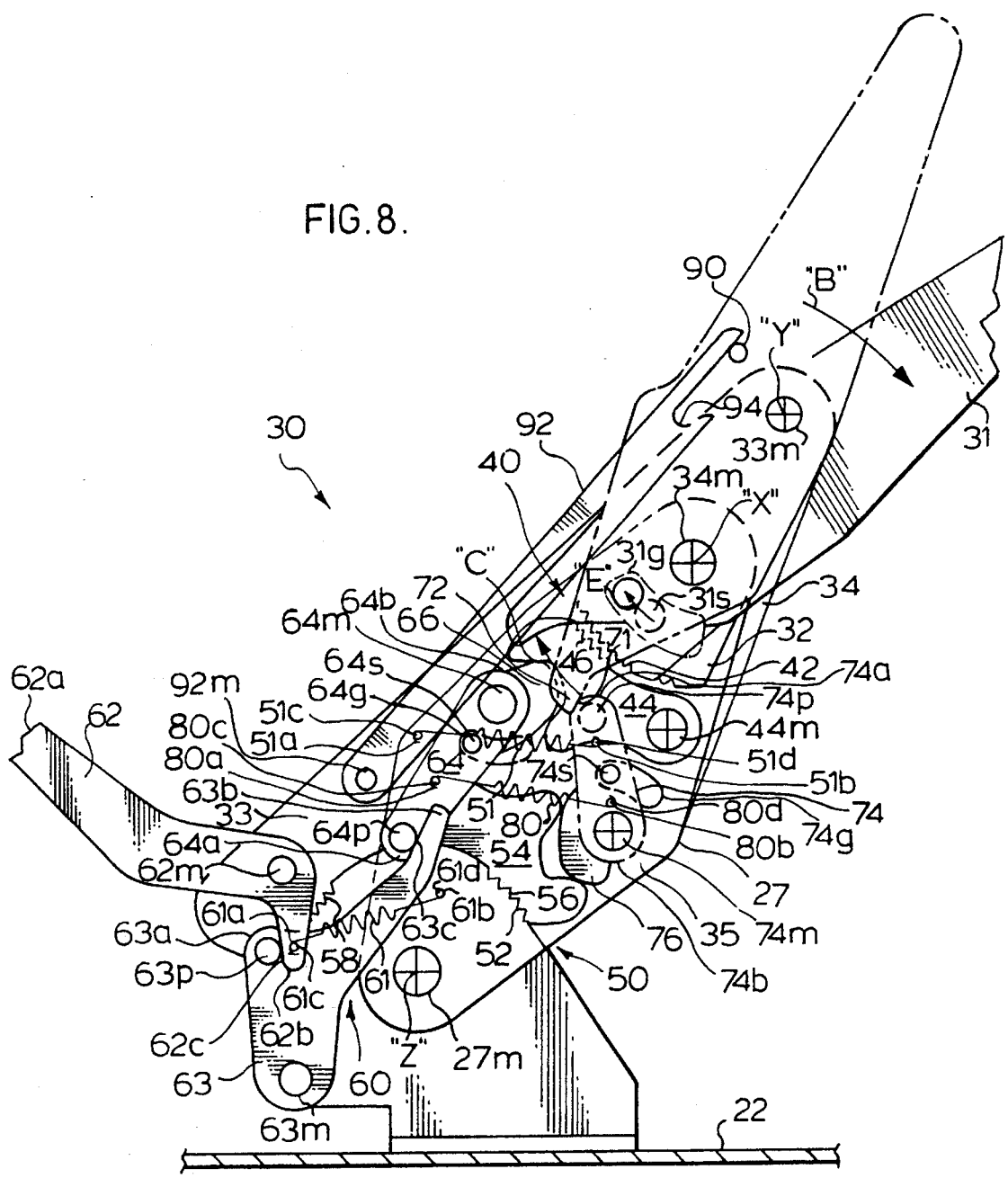

The seatback member 26 is also selectively reclinable in the rearward direction to other generally upright occupiable positions, as shown by arrow "B" in FIG. 8, in order to provide for angular adjustability of the seating position for the comfort of a seat occupant. During the action of rearward reclining, a downwardly depending trip arm 72 of the first seatback member hinge plate 31 moves forwardly and upwardly, as shown by arrow "C" of FIG. 8, as does the stop pin 31s, as shown by arrow "E". The stop pin 31s travels within the guide slot 31g so as to limit the travel of the first seatback member hinge plate 31, and thus the seatback member 26, in a rearward reclining manner.

In the preferred embodiment illustrated, the seat cushion member 28 has a pair of front seat legs 29 and a pair of rear seat legs 27. Alternatively, it is possible that a centrally disposed single seat leg in the front or in the rear could be used.

The front seat legs 29 are each pivotally mounted adjacent one of their respective ends to the seat cushion member 28, and are pivotally mounted at their opposite other respective free ends to the floor member 22 of the vehicle 24 by way of a mounting means in the form of a mounting pin 29m securely retained within a respective attachment member in the form of a mounting bracket 38. Each of the mounting brackets 38 is secured to the floor member 22 of the vehicle 24 by conventional fastening means such as threaded fastening members or by welding (not shown).

Each of the rear seat legs 27, which includes an assembly comprised of a first intermediate hinge plate 34 and a second intermediate hinge plate 35, is pivotally mounted with respect to the seat cushion member 28 by way of seat cushion member hinge plate 33, as described above. The rear seat legs 27 are also pivotally mounted at their opposite other respective free ends to the floor member 22 of the vehicle 24 by way of a mounting means in the form of a mounting pin 27m securely retained within a respective attachment member in the form of a two piece mounting bracket 36. Each two piece mounting bracket 36 is rigidly affixed to the floor member 22 of the vehicle 24 by conventional fastening means such as threaded fastening members or by welding (not shown).

The pivotal mounting of all of the front 29 and rear 27 seat legs to the seat cushion member 28 and to the floor member 22 of the vehicle 24, facilitates movement of the seat cushion member 28 from its first in-use position, as shown in solid lining in FIG. 1, to its second forwardly translated stowed position, as shown in FIG. 2.

Operatively connected between the seatback member 26 and the seat cushion member 28 is a latch means, as designated by the general reference numeral 40, preferably mounted on the rear seat leg 27. Typically, only one of the rear seat legs will have the latch means 40 mounted thereon, in the interest of cost reduction. Accordingly, and for the sake of convenience, only one of the rear seat legs will generally be referred to in the detailed description henceforth, although it will be readily understood that a second latch means similar to the latch means 40 may be advantageously utilized on the laterally opposite other rear seat leg (not shown). The latch means 40 holds the seatback member 26 in fixed angular relation with respect to the seat cushion member 28.

Figure 3:
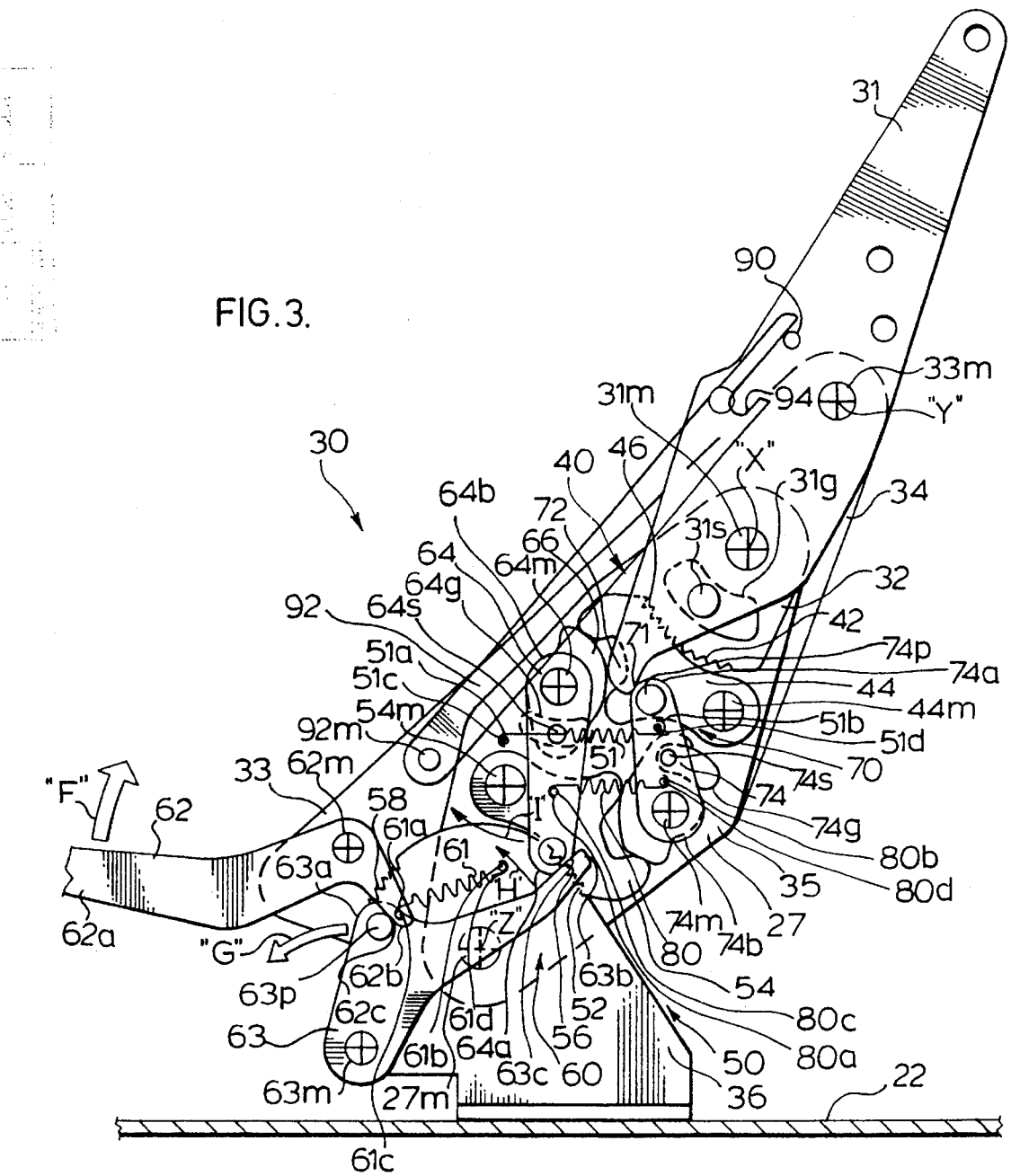
FIG. 3 is a side elevational view of the hinge assembly of the moveable seat assembly of FIG. 1, shown on an enlarged scale, with portions of some of the members removed for ease of illustration.
Figure 4:
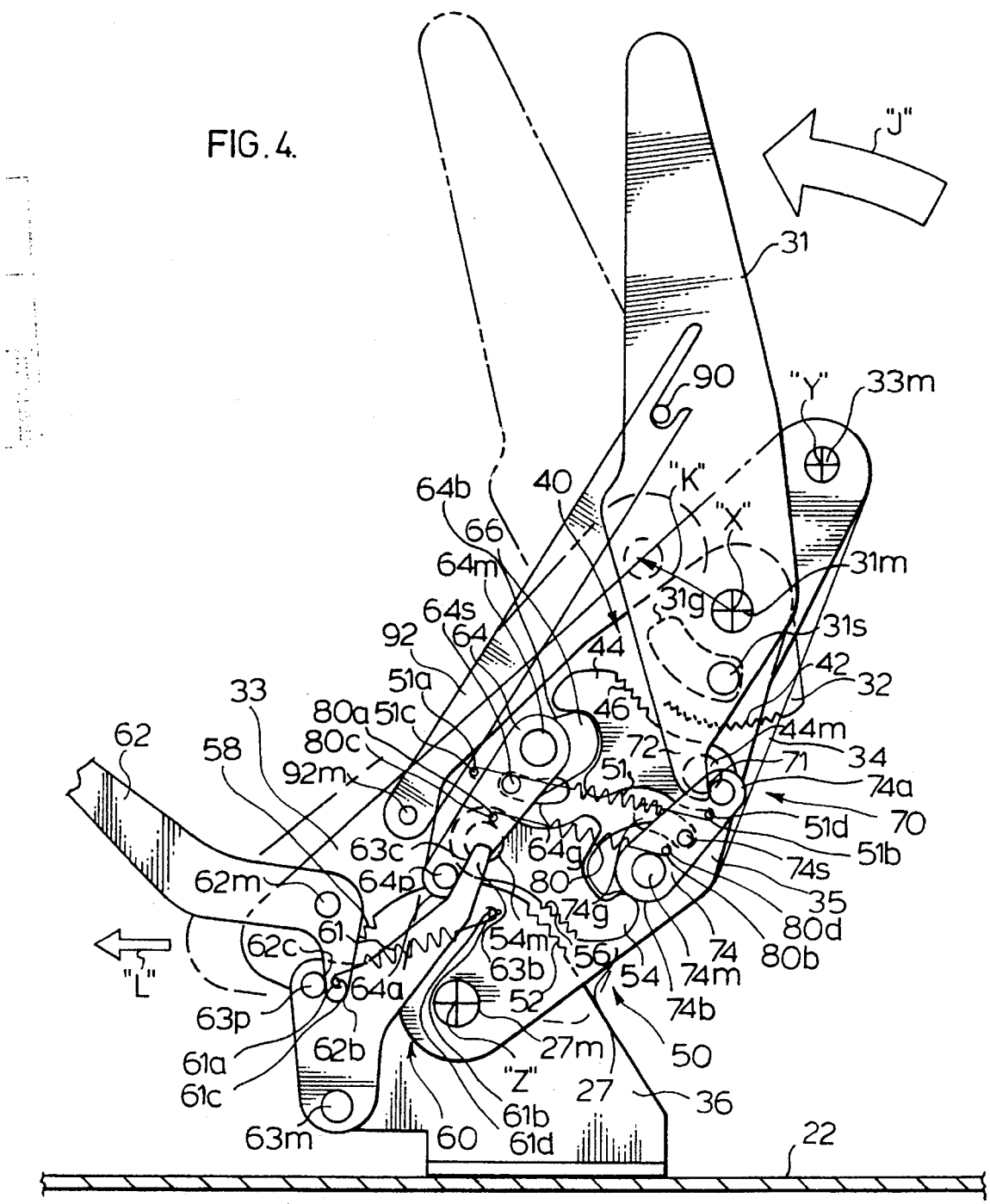
FIG. 4 is a side elevational view of the hinge assembly of FIG. 3, with the seat cushion member shown in solid outline in a first intermediate forwardly folded configuration and shown in ghost outline in a second forwardly folded configuration.
Figure 5:
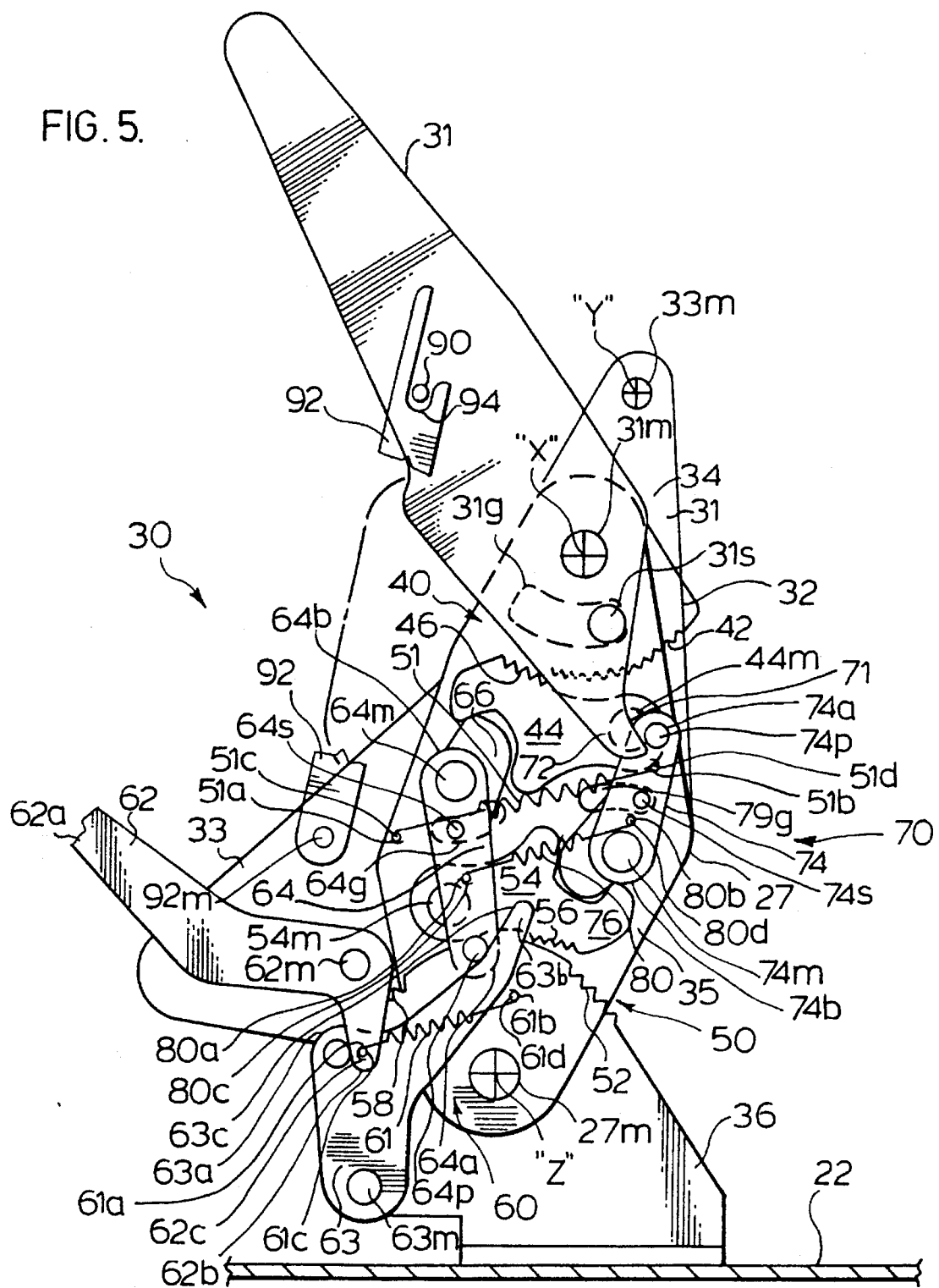
FIG. 5 is a side elevational view similar to FIG. 4, with the seatback member shown in solid lining in an even more forwardly folded configuration.

The latch means 40 comprises a first teeth means 42 formed as an integral part of the second seatback member hinge plate 32 and a latch pawl 44 having a complementary second teeth means 46 formed as an integral part thereof. The latch pawl 44 is pivotally mounted by way of mounting pin 44m on the rear seat leg 27 between the spaced apart first intermediate hinge plate 34 and second intermediate hinge plate 35 for movement between a first latch pawl position, as shown in FIG. 3, and a second latch pawl position, as shown in FIG. 4. In the first latch pawl position the second teeth means 46 cooperatingly engages the first teeth means 42 in order to obtain a first latched configuration of the latch means 40. In the second latch pawl position, the second teeth means 46 is removed from such engagement with the first teeth means 42, in order to obtain a second unlatched configuration of the latch means 40. The latch means 40 is thereby moveable between a first latched configuration, whereat the pivotal movement of the seatback member 26 is arrested, and a second unlatched configuration, whereat the pivotal movement of the seatback member 26 is permitted.

A first actuation means, as designated by the general reference numeral 60, is used to actuate the latch means 40. The first actuation means 60 comprises a user handle 62, a bell crank member 63, a lever arm 64, and a first cam member 66 operatively interconnected as will be described subsequently. The bell crank member 63 and the lever arm 64 act as intervening components between the user handle 62 and the first cam member 66. The user handle 62 has a grasping portion 62a and a contacting portion 62b, and is pivotally mounted by way of a mounting pin 62m on the two piece mounting bracket 36 for movement in the direction of arrow "F" of FIG. 3 between a first neutral position, as best seen in FIG. 3, and a second actuated position, as best seen in FIG. 4. The user handle 62 is biased towards its first neutral position by a first spring biasing means 61, which is attached at its first end 61a to a cooperating lug 61c on the user handle 62, and is operatively attached at its opposite second end 61b to a cooperating lug 61d on the two piece mounting bracket 36.

With the arrangement shown, when the user handle 62 is in its first neutral position, the latch means 40 is in its first latched configuration. When the user handle 62 is in its second actuated position, the latch means 40 is in its second unlatched configuration. The movement of the user handle 62 from its first neutral position to its second actuated position causes corresponding respective movement of the bell crank member 63 that is pivotally mounted by way of a mounting pin 63m on the two piece mounting bracket 36. The bell crank member 63 pivots between a first position, as shown in FIG. 3, and a second position, as shown in FIG. 4. A first free end 63a of the bell crank member 63 moves in a direction as indicated by arrow "G" of FIG. 3, and a second free end 63b of the bell crank member 63 moves in a generally opposite direction as indicated by arrow "H" of FIG. 3. A protruding post 63p adjacent the first free end 63a of the bell crank member 63 is operatively engaged by the contacting portion 62c at the second end 62b of the user handle 62, and a contacting terminal portion 63c at the second free end 63b of the bell crank member 63 operatively engages a protruding post 64p at one end 64a of a lever arm 64, which lever arm 64 is pivotally mounted intermediate its length by way of a mounting pin 64m between the first intermediate hinge plate 34 and the second intermediate hinge plate 35. The lever arm 64 pivots in a direction as indicated by the arrow "I" of FIG. 3 when operatively engaged by the bell crank member 63. The opposite other end 64b of the lever arm 64 operatively engages a first cam member 66 by way of a stop pin 64s protruding through guide slot 64g, which stop pin 64s limits the travel of the lever arm 64 between its extreme positions. The first cam member 66 is pivotally mounted coaxially with the lever arm 64 between the first intermediate hinge plate 34 and the second intermediate hinge plate 35. The first cam member 66 and the lever arm 64 move pivotally in conjunction with each other. The first cam member 66 moves between a first cam position whereat the first cam member 66 has urged the latch pawl 44 in a first pivotal direction into the first latch pawl position, and a second cam position whereat the first cam member 66 has urged the latch pawl 44 in a second opposite pivotal direction to the second latch pawl position. In this manner, movement of the user handle 62 from the first rest position to the second enabled position is transmitted by the bell crank member 63, the lever arm 64, and the first cam member 66, so as to cause corresponding movement of the latch pawl 44 from its first latch pawl position to its second latch pawl position.

Operatively mounted between the seat cushion member 28 and the floor member 22 of the vehicle 24 is a lock means, as designated by the general reference numeral 50, preferably mounted on the rear seat leg 27. The lock means 50 is moveable between a first locked configuration shown in FIG. 3, at which the lock means restrainingly engages the respective attachment member 36 so as to hold the seat cushion member 28 in its first in-use position, and a second unlocked configuration shown in FIG. 4 and 5 at which the seat cushion member 28 is permitted to move as aforesaid towards the second forwardly translated stowed position. The lock means 50 comprises a first teeth means 52 formed as an integral part of the two piece mounting bracket 36, and a lock pawl 54 having a complementary second teeth means 56 formed as an integral part thereof. The lock pawl 54 is pivotally mounted by way of mounting pin 54m on the rear seat leg 27 between the spaced apart first intermediate hinge plate 34 and second intermediate hinge plate 35 for movement between a first lock pawl position and a second lock pawl position. In the first lock pawl position (see FIG. 3) the second teeth means 56 cooperatingly engages the first teeth means 52 so as to cause the lock means 50 to assume its first locked configuration. In the second lock pawl position (see FIGS. 4 and 5), the second teeth means 56 is removed from such engagement with the first teeth means 52 so as to cause the lock means 50 to assume its second unlocked configuration.

A second actuation means, as designated by the general reference numeral 70, is used to actuate the lock means 50. The second actuation means 70 comprises a downwardly depending trip arm 72, a second lever arm 74, and a second cam member 76, (which are readily identifiable in FIG. 7). The downwardly depending trip arm 72 is an integral part of the first seatback member hinge plate 31. The second lever arm 74 is pivotally mounted by way of a mounting pin 74m at a first end 74a, intermediate its length between the spaced apart first intermediate hinge plate 34 and second intermediate hinge plate 35. A protruding post 74p on the first end 74a of the second lever arm 74 operatively engages the downwardly depending trip arm 72. A second end 74b of the second lever arm 74 operatively engages the second cam member 76 by way of a stop pin 74s protruding through guide slot 74g, which stop pin 74s limits the travel of the lever arm 74 between its extreme positions. The second cam member 76 is pivotally mounted coaxially with the second lever arm 74 between the first intermediate hinge plate 34 and the second intermediate hinge plate 35. The second cam member 76 and the second lever arm 74 move pivotally in conjunction with each other. The second cam member 76 moves between a first cam position whereat the second cam member 76 has urged the lock pawl 54 in a first pivotal direction into the first lock pawl position (as seen in FIG. 3), and a second cam position whereat the second cam member 76 has urged the lock pawl 54 in a second opposite pivotal direction to the second lock pawl position (seen in FIG. 4) corresponding to the second unlocked configuration of the lock means 50.

A second spring biasing means 51 is attached at one end 51a thereof to the first intermediate hinge plate 34 by way of a lug 51c and is attached at the other end 51b thereof to the second lever arm 74 by way of a lug 51d. The second spring biasing means 51 acts on the lock means 50 through the second lever arm 74 to bias the lock means 50 towards its first locked configuration.

A contacting surface 71 on the downwardly depending trip arm 72 operatively contacts the protruding post 74p on the second lever arm 74 when the first seatback member hinge plate 31 is moved forwardly, as shown by arrow "J" of FIG. 4, so as to cause pivoting of the second lever arm 74 and the second cam member 76. This contact of the contacting surface 71 and the post 74p occurs at a first design position which is just slightly forward of the position of the seatback hinge plate 31 as shown in FIG. 3. Upon continued motion of the seatback member 26 in the direction of arrow "J" beyond the first design position, the second cam member 76 is moved by the contacting surface 72 from its first cam position (as shown in FIG. 3), to its second cam position, which correspondingly permits the lock pawl 54 to move from its first lock pawl position to its second lock pawl position. When the seatback member 26 is moved from its generally upright occupiable configuration, as shown by arrow "J" through the first design position, to any of the relatively forwardly folded unoccupiable configurations shown in dashed outline in FIGS. 1 and 4, the lock means 50 has been caused to move from its first locked configuration to its second unlocked configuration. When the lock means 50 is in its second unlocked configuration (as seen in FIG. 4), the seat cushion member 28 is correspondingly released, and is thereby permitted to move from its first in-use position to its second forwardly translated stowed position, as shown by arrow "L" in FIG. 4, upon continued pivotal movement in the same forward direction of the seatback member 26. In order to permit the seat cushion member 28 to move from its first in-use position to its second forwardly translated stowed position, the first intermediate hinge plate 34 and the second intermediate hinge plate 35 that form the rear seat leg 27, pivot forwardly as shown by arrow "K" in FIG. 4.

There is preferably provided a third spring biasing means 80 operatively connected at one end 80a thereof to a lug 80c on the first lever arm 64, and operatively connected at its opposite other end 80b to a lug 80d on the second lever arm 74. In this manner, the third spring biasing means is operatively interconnected between the first lever arm 64 and the second lever arm 74 so as to simultaneously bias the first actuation means 60 towards its neutral position and the second lock means towards its first locked configuration.

Figure 6:
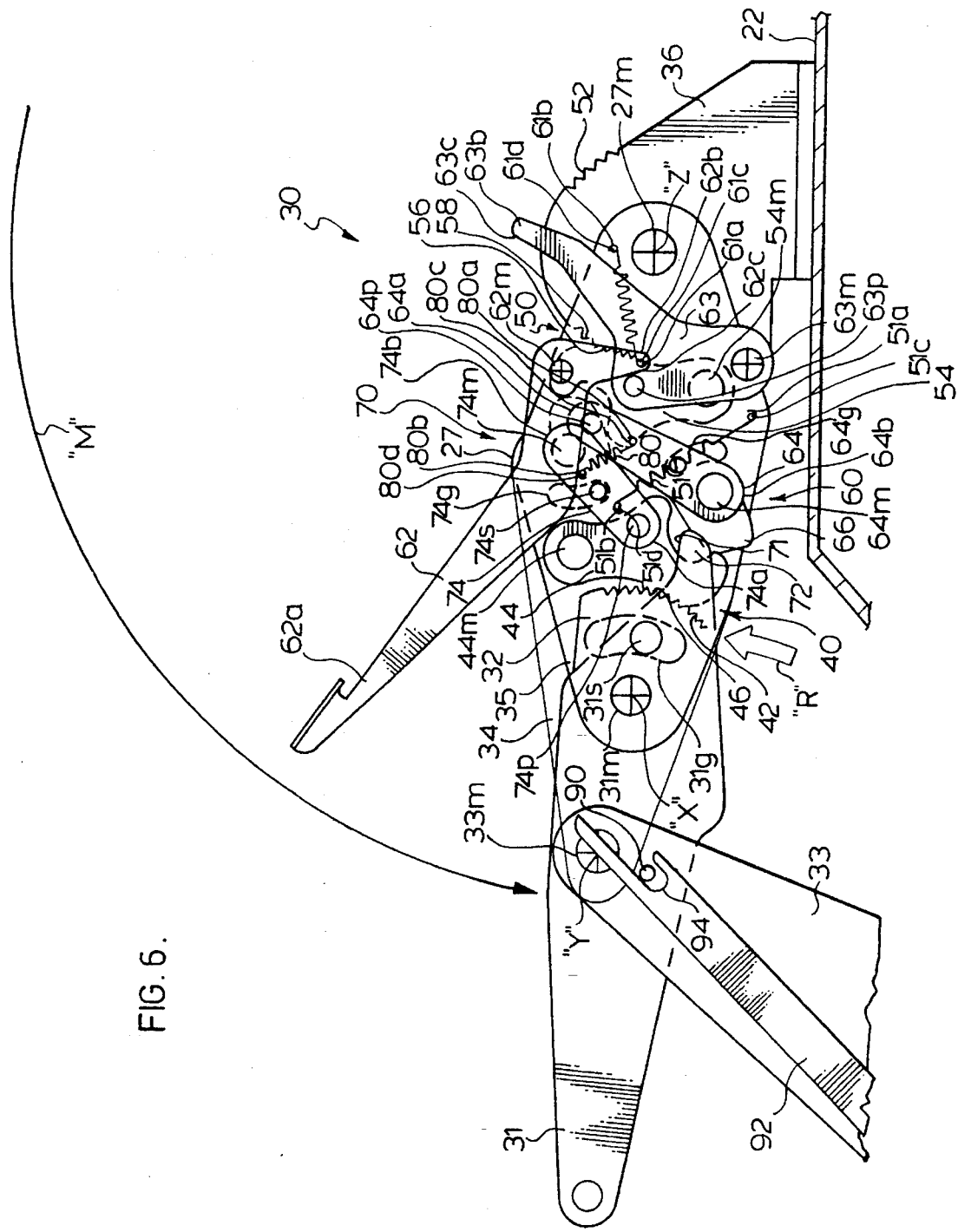
FIG. 6 is a side elevational view of the hinge assembly of FIG. 3, with the seat cushion member in a completely forwardly folded unoccupiable configuration.
Figure 7:
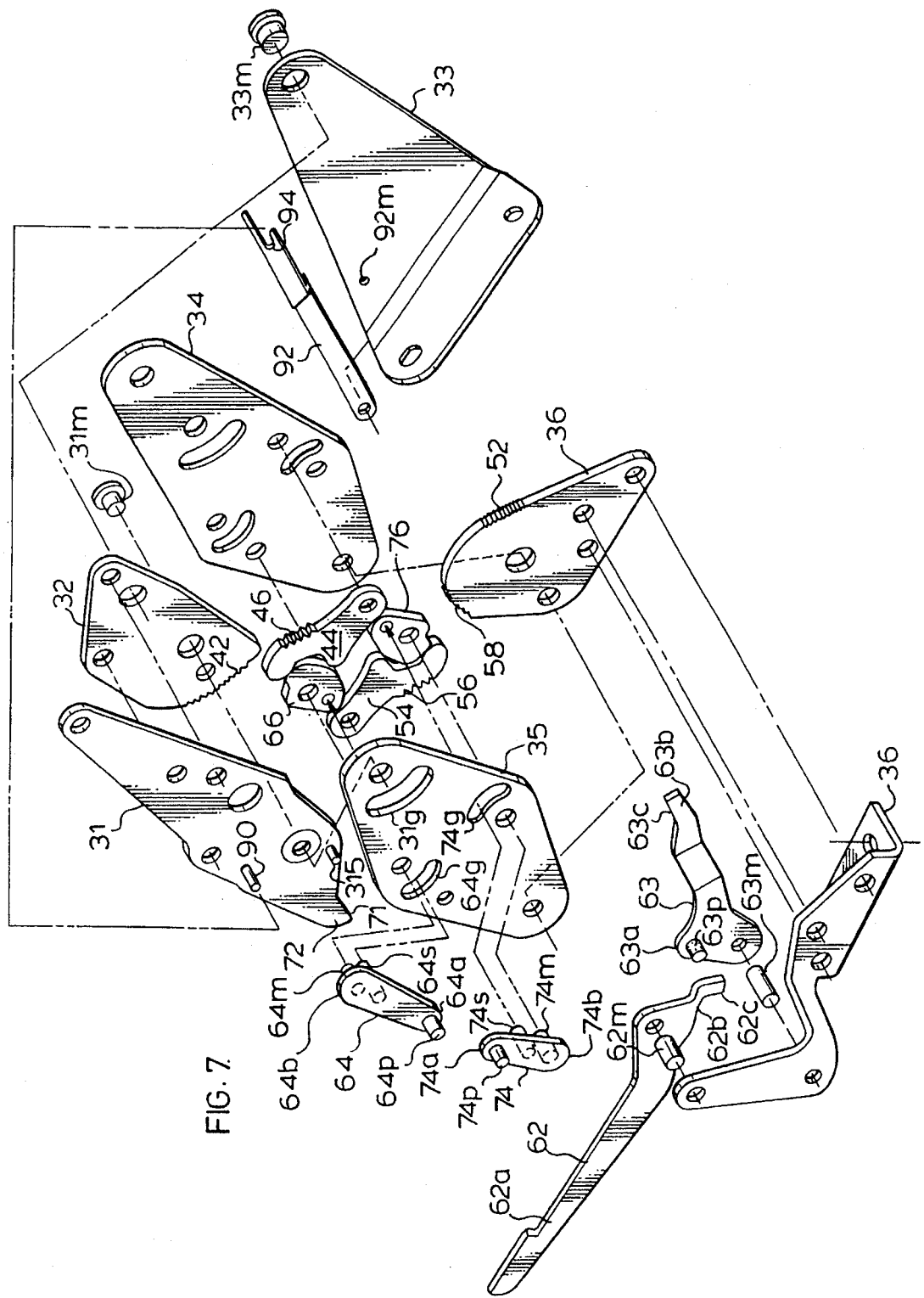
FIG. 7 is an exploded perspective view of the hinge assembly of FIG. 3 with certain spring biasing means, spacers etc. omitted for ease of illustration; and, FIG. 8 is a side elevational view of the hinge assembly of FIG. 3, with the seatback member shown in solid lining in a rearwardly reclined configuration.

The lock means 50 is further moveable from its first locked configuration (see FIG. 3), through its second unlocked configuration (see FIG. 4), and to a third locked configuration seen in FIG. 6. The second spring biasing means 51 also biases the lock means 50 towards the third locked configuration. At this third locked configuration, the second teeth means 56 on the lock pawl 54 restrainingly engage a third teeth means 58 on the two piece mounting bracket 36. This third locked configuration can be achieved only when the seat cushion member 28 is in its second forwardly translated stowed position. The second teeth means 56 restrainingly engage the third teeth means 58 on the two piece mounting bracket 36 so as to lockingly hold the seat cushion member 26 in the second design position.

In order to achieve this second design position, the seatback member 26 must pivot with respect to the rear seat leg 27, which rear seat leg 27 comprises the first intermediate hinge plate 34 and the second intermediate hinge plate 35. It is also preferred that the first teeth means 42 and the second teeth means 46 of the latch pawl 44 again engage with one another at the second design position so as to restrain the seatback member 26 from unwanted movement and vibration. In order to achieve this restraining latch-up of the latch means 40, it is necessary that the seatback member 26 undergo retrograde pivotal motion after it passes through the design position to once again align the first teeth means 42 with the second teeth means 46. This retrograde pivotal motion is caused mostly by the forwardly directed angular rotation of the rear seat leg 27 when the seat cushion member 26 is moved from its first in-use position to its second forwardly translated stowed position. However, a final amount of retrograde pivotal motion of the seatback member 26 is preferably positively mechanically induced as the seatback member 26 is nearing its second design position so as to ensure accurate alignment of the first teeth means 42 with the second teeth means 46. In the preferred embodiment shown, this is achieved by having an arm member 92 securely pivotally mounted on the seat cushion member 26. The arm member 92 is adapted by way of a receiving notch 94 to receive a pin member 90, which pin member 90 is securely attached to the seatback member 26. The pin member 90 cooperatingly engages the receiving notch 94, which thereby acts as a pin receiving means, upon forward pivotal movement of the seatback member 26 toward the relatively forwardly folded unoccupiable position, at a point beyond the first design position. Continued forward movement of the seatback member 26 and the seat cushion member 28 together, cause retrograde pivotal motion of the seatback member 26 in a direction as shown by arrow "R", to thereby cause the latch means 40 to attain its first latched configuration at the aforedescribed second design position of the seatback member 26 as best seen in FIG. 6. Further, at this position, the lock means 50 attains its aforedescribed third locked configuration, so as to lock the seat cushion member 26 in its second forwardly translated stowed position.

Various other routine changes may be made to the structures shown and described without departing from the spirit and scope of the present invention, which is limited only by the appended claims which follow.

We claim:

1. A movable seat assembly for use in a vehicle having a floor member, said seat assembly comprising:

a seatback member pivotally mounted on a seat cushion member so as to permit pivotal movement in a forward direction between a generally upright occupiable configuration and a relatively forwardly folded unoccupiable configuration, said seat cushion member having front seat legs pivotally mounted thereon adjacent the upper ends of said front seat legs and said seatback member having rear seat legs pivotally mounted thereon adjacent the upper ends of said rear seat legs;

each of said front seat legs being pivotally mounted adjacent their lower ends to a respective front attachment member shaped and dimensioned to be affixable to said floor member:

each of said rear seat legs being pivotally mounted adjacent their lower ends to a respective rear attachment member shaped and dimensioned to be affixable to said floor member and with at least one of said rear attachment members having a circumferential surface presenting first teeth means;

said pivotal mounting of said front and rear seat legs permitting movement of said seat cushion member from a first in-use position within the vehicle to a second forwardly translated stowed position within the vehicle;

a latch means operatively connected between the seatback member and the seat cushion member for movement between a first latched configuration at which said pivotal movement of said seatback member is arrested and a second unlatched configuration at which said pivotal movement of said seatback member is permitted;

a lock means mounted on the rear seat leg associated with the rear attachment member having said first teeth means for movement between a first locked configuration whereat a second teeth means mounted on said lock means restrainingly engages said first teeth means on the respective rear attachment member so as to hold said seat cushion member in said first inuse position, and a second unlocked configuration at which said second teeth means on said lock means are removed from engagement with said first teeth means on said rear attachment member, and the seat cushion member is permitted to move as aforesaid toward said second forwardly translated stowed position;

a first actuation means mounted on the seat assembly so as to be operatively moveable by a user from a neutral position whereat said latch means is held by the actuation means in said first latched configuration, to an actuated position whereat said latch means has been urged by said first actuation means to said second unlatched configuration to permit said pivotal movement of the seatback member; and, a second actuation means mounted on the seat cushion member so as to be operatively contacted by a portion of the seatback member at a first design position of the seatback member upon said pivotal movement of said seatback member in said forward direction to move the lock means from said first locked configuration to said second unlocked configuration, so as to permit said movement of said seat cushion member from said first in-use position to said second forwardly translated stowed position upon continued pivotal movement of the seatback member beyond said first design position in said forward direction.

2. The movable seat assembly of claim 1, additionally comprising a first spring biasing means acting on said first actuation means to bias said first actuation means towards its said neutral position.

3. The movable seat assembly of claim 2, additionally comprising a second spring biasing means acting on said lock means to bias said lock means towards its said first locked configuration.

4. The movable seat assembly of claim 1, additionally comprising a third spring biasing means interconnected between said first actuation means and said second actuation means to simultaneously bias said first actuation means towards said neutral position and said lock means towards said first locked configuration.

5. The movable seat assembly of claim 3, wherein said lock means is further movable from said first locked configuration through said second unlocked configuration to a third locked configuration, at which third locked configuration said lock means restrainingly engages the respective rear attachment member so as to hold said seat cushion member in said second forwardly translated stowed position.

6. The movable seat assembly of claim 5, wherein said second spring biasing means also biases said lock means towards said third locked configuration.

7. The movable seat assembly of claim 6, wherein said latch means comprises a first teeth means rigidly mounted on the seatback member, and a latch pawl having a complementary second teeth means pivotally mounted on said at least one of said rear seat legs for movement between a first latch pawl position whereat said second teeth means engages said first teeth means to obtain said first latched configuration, and a second latch pawl position whereat said second teeth means is removed from such engagement to obtain said second unlatched configuration.

8. The movable seat assembly of claim 7, wherein said first actuation means comprises a user handle pivotally mounted on said seat cushion member for movement from a first rest position to a second enabled position, which movement causes, through the agency of further intervening components of the first actuation means, corresponding respective movement of a first cam member pivotally mounted on said at least one of said rear seat legs from a first cam position, whereat said cam member has urged said latch pawl in a first pivotal direction into said first latch pawl position, to a second cam position whereat said cam member has urged said latch pawl in a second opposite pivotal direction to said second unlatched configuration.

9. The movable seat assembly of claim 8, wherein said further intervening components of the first actuation means comprise a bell crank member having first and second free ends, said bell-crank member being pivotally mounted on said at least one Of said rear seat legs and operatively engaging said user handle at said first free end and operatively engaging, at said second free end, one end of a lever arm pivotally mounted intermediate its length on said at least one of said rear seat legs, said lever arm being operatively interconnected at its opposite other end to said cam member, whereby movement of said user handle from said first rest position to said second enabled position is transmitted by said bell crank member, said lever arm and said cam member connected as aforesaid, to corresponding movement of said latch pawl from said first latch pawl position to said second latch pawl position.

10. The movable seat assembly of claim 1, wherein, said portion of the seatback member that operatively contacts said second actuation means comprises a downwardly depending trip arm member rigidly attached to said seatback member.

11. The movable seat assembly of claim 10, wherein said first design position of the seatback member is an intermediately forwardly folded position.

12. The movable seat assembly of claim 11, wherein said from seat legs are each pivotally mounted adjacent one of their respective ends to said seat cushion member and are also each pivotally mountable at their opposite other respective free ends to the floor member of said vehicle, so as to facilitate movement of said seat cushion member from said first in-use position to said second forwardly translated stowed position.

13. The movable seat assembly of claim 12, additionally comprising a pin member securely attached to the seatback member and an arm member securely mounted on the seat cushion member, said arm member having a pin receiving notch shaped and dimensioned to receive said pin member upon said pivotal movement of said seatback member toward said relatively forwardly folded unoccupiable position at a point beyond said first design position so as to cause retrograde pivotal motion of said seatback member toward said generally upright occupiable configuration relative to the rear leg thereby aligning said first teeth means on said seatback member with said second teeth means on said latch pawl to permit said latch means to attain said first latched configuration at a second design position of the seatback member corresponding to said relatively forwardly folded configuration, with said lock means in its third locked configuration.

14. The movable seat assembly of claim 13, wherein, at said second design position, the rear surface of said seatback member is substantially horizontally aligned with an adjacent rearwardly disposed section of said floor member.

* * * * *